3,745,088
ACTIVE WATER-INSOLUBLE ENZYMES
Charles L. Mehltretter and Francis B. Weakley, Peoria, Ill., assignors to the United States of America as represented by the Secretary of Agriculture
No Drawing. Filed Dec. 23, 1970, Ser. No. 101,134
Int. Cl. C07g 7/02
U.S. Cl. 195—63                2 Claims

ABSTRACT OF THE DISCLOSURE

Enzymes are insolubilized by coupling them to the diazotized anthranilates of modified and unmodified starch. These water-insoluble enzymes can be activated before each use by conventional means.

---

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

The invention relates to water-insoluble enzymes and their preparation. More specifically, it relates to the chemical coupling of an enzyme to diazotized starch anthranilate. The instant enzyme composition is especially suited for enzymatic processes in which it is desirable to remove essentially all of the enzyme from the desired product (e.g., chill proofing of beer).

At the present time, carriers in use for enzyme insolubilization are synthetic copolymers based on acrylamide containing aromatic amine residues which are diazotized for coupling to enzymes, polyacrylamide gel which entraps the enzyme and immobilizes it, and polyionic carriers such as diethylaminoethylcellulose which physically adsorbs the enzyme. Recently chemically coupled enzymes have also been prepared through diazotized aminoaaryl silane substituted porous glass. Such water-insoluble enzyems are used either in suspension or in packed columns. Their advantages are that they may be recovered by simple filtration or centrifugation if used in suspension; retain enzyme activity and so permitting them to be used repeatedly; stabilize the enzyme; and allow better control of an enzyme process. In contrast, recovery of soluble active enzyme is generally not practical or if the enzyme is left in the reaction mixture it is a contaminant.

An object of the invention is the provision of an enzyme which is insolubilized by being chemically coupled to a starch carrier and which retains much of its original activity. A further object is the provision of a water-insoluble enzyme that is relatively immune to attack by microorganisms which might otherwise destroy the starch carrier resulting in solubilization and loss of enzyme.

In accordance with the objects of the invention, we have discovered a process for preparing active water-insoluble enzymes. Starch anthranilates having a degree of substitution (D.S.) of anthranilate substituents of from about 0.01 to 0.10 are diazotized by reacting the starch anthranilates with nitrous acid at a pH of from 1 to 3 and at a temperature of 0°–10° C. The diazotized derivatives are then reacted at a pH of about 8 to 9 with an excess of enzyme having substituents capable of coupling with diazonium groups. The water-insoluble enzyme is then isolated and activated.

DETAILED DESCRIPTION OF THE INVENTION

The preparation of azo dyes of starch anthranilates was described in U.S. Pat. 3,499,886. As an intermediate step in that process, starch anthranilate was diazotized giving the following general structure:

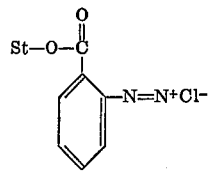

where St=the starch moiety.

The preparation of a water-insoluble enzyme having the general structure

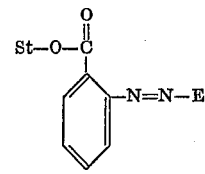

where St=starch and E=enzyme is described here.

The raw starch starting material can be any water-insoluble starch including corn starch, wheat starch, potato starch, tapioca starch, high-amylose corn starch, potato or corn amylose, and amylopectin. These starches are capable of reacting part of their hydroxyl groups with such chemicals as acrylonitrile, epichlorohydrin, acetic anhydride and the like followed by reaction with isatoic anhydride to produce the corresponding anthranilate products, any of which are suitable for use in the instant process. These anthranilate products can be in either the granular or gelatinized forms. The anthranilates of the starches of preferred D.S. of 0.01 to about 0.1 are readily diazotized with nitrous acid at 0°–10° C. (pH 1–3). The resulting diazonium chlorides of the starch anthranilates are then immediately reacted with excess enzyme at pH of about 8 to 9 for 15 minutes to 24 hours at room temperature or below. Under these conditions of concentration, temperature, and pH the enzyme is still quite active. The preferred enzyme is papain, but many other enzymes (e.g., glucoamylases and isomerases) can be insolubilized and stabilized by the instant method. A large excess of enzyme is preferred to avoid coupling the active cites in the enzymes to too great an extent and possibly inactivating the enzyme. Although not confirmed, it is believed that coupling of the diazonium chloride group of the starch anthranilate to a portion of the tyrosine moieties in the enzyme occurs in such a manner that the enzyme's active cites are not greatly affected. The product is centrifuged or filtered and washed free of excess enzyme. The water-insoluble enzymes prepared in this manner can be recovered after each use by centrifuging or filtering and recycled. The moist product is stored in a refrigerator at about 10° C. until it is used. Before each use the enzyme can be activated by any conventional method. Hydrogen sulfide was used in the examples only because it did not interfere with subsequent analyses as would cysteine in combination with the sodium salt of ethylenediamine tetraacetic acid.

The water-insoluble papain obtained by our novel process becomes stabilized, after several reactions with substrate, to a constant level of activity. Since most enzyme reactions with various substrates are carried out at pH 4 to about 7, hydrolysis of the starch backbone and saponification of the ester linkages in the water-insoluble enzyme are not expected to occur to any significant extent.

The water-insoluble enzyme compositions prepared with modified starches, such as cyanoethylated and acetylated starch, are expected to be resistant to microbial attack on the starch backbone of the carrier.

The following examples illustrate our invention.

EXAMPLE 1

Preparation of water-insoluble papain

Step 1. Preparation of starch anthranilate of D.S. 0.10.—To 50 g. pearl corn starch (44 g. oven-dry basis) slurried in 75 ml. of water by mechanical agitation was added 5 g. of sodium carbonate followed by 5 g. of isatoic anhydride. The mixture was stirred for 4 hours at about 45° C. and the final pH of the reaction mixture was 9.2. The starch anthranilate was filtered by suction and washed three times by agitation in 60 ml. of water with intermediate filtration. The last wash was adjusted to pH 5 with dilute hydrochloric acid. The product was air-dried and weighed 46 g. (oven-dry basis). Nitrogen analysis indicated the D.S. to be 0.10.

Step 2. Diazotization of starch anthranilate of D.S. 0.10 (see U.S. Pat. 3,499,886).—Five g. of starch anthranilate of D.S. 0.10 was mechanically stirred in 60 ml. of water and adjusted to pH 2 with 4 N hydrochloric acid. The mixture was cooled to 0° C. and 0.8 g. of sodium nitrite added and the whole stirred at 0°–5° C. for 10 minutes with the addition of more HCl to maintain the pH at about 2. The mixture then stood at about 5° C. for an hour with occasional stirring. The diazotized starch anthranilate was then filtered by suction and washed on the filter with water several times to remove nitrous acid.

Step 3. Coupling to papain.—The wet diazonium chloride prepared from starch anthranilate was added to a solution of 20 g. of technical grade papain in 600 ml. of water and stirred at pH 8.4 for 30 minutes and allowed to stand at 10° C. overnight. The water-insoluble coupled enzyme was separated by filtration and washed four times with 100 ml. of water. The moist product was stored at 10° C. until assayed for enzyme activity. The final wash water was free of active papain.

The water-insoluble papain prepared as described above was assayed daily for 10 days and isolated each day for reuse. The procedure was as follows: Wet insolubilized papain (8.2 g., 66% water) was activated in 100 ml. of half-saturated $H_2S$–$H_2O$ for 1 hour with occasional stirring, then sparged with nitrogen, and was isolated by centrifugation. The activated insoluble papain was admixed with 10 ml. of 6% Hammersten casein and immediately adjusted to pH 5.1 with citrate buffer. The system was incubated for 3 hours at 40° C. with frequent stirring and then diluted to 100 g. with water and adjusted to pH 4.2 by dropwise addition of 4 N HCl. The diluted digest was centrifuged and 1 ml. of supernatant removed for colorimetric assay with ninhydrin reagent solution. Difference between the ninhydrin color yield of the digested casein and that of an undigested casein was used for comparison with the color yields obtained when varying amounts of the soluble papain were used in casein hydrolyses. By this assay, 1 g. (oven-dry basis) of the water-insoluble papain was found, after several leachings with water, to reach a relatively constant level of proteolytic activity equivalent to approximately 20 mg. soluble papain. The water-insoluble papain was isolated from the digest for reuse by exhaustive aqueous extraction at pH 8 to remove substrate. Thereafter, the insolubilized papain, following reactivation, was reused in the hydrolysis of casein.

The table below shows the activity of the chemically coupled papain after 10 successive hydrolysis runs using a casein substrate.

| Hydrolysis runs: | Sample activity, Mg./g. |
|---|---|
| 1 | 51 |
| 2 | 53 |
| 3 | 52 |
| 4 | 23 |
| 5 | 20 |
| 6 | 20 |
| 7 | 20 |
| 8 | 21 |
| 9 | 21 |
| 10 | 20 |

A nearly constant level of proteolytic activity was obtained after three successive hydrolyses of casein.

EXAMPLE 2

Preparation of water-insoluble papain

Step 1. Preparation of cyanoethylstarch anthranilate.—Fourty-four g. of cyanoethylstarch of D.S. 1.0 was reacted with isatoic anhydride as described in Example 1 to yield 43.5 g. of cyanoethylstarch anthranilate of D.S. 0.01.

Step 2. Diazotization of cyanoethylstarch anthranilate.—Five g. of the cyanoethylstarch anthranilate was diazotized as described in Example 1 to yield the wet diazonium chloride.

Step 3. Coupling to papain.—The wet diazonium chloride was stirred for 30 minutes at pH 8.5 in a solution of 20 g. of technical grade papain in 500 ml. of water. The reaction mixture then stood at 10° C. overnight and the water-insoluble papain was recovered by centrifugation and washed well with water as in Example 1. The final wash water was devoid of active papain.

Activity of the product was determined as described in Example 1. A constant level of proteolytic activity equivalent to 140 mg. of soluble papain per gram of dry product was obtained after three successive hydrolyses of casein.

EXAMPLE 3

Preparation of water-insoluble papain

Step 1. Preparation of cyanoethylstarch anthranilate.—Fifty g. of cyanoethylstarch of D.S. 0.10 was reacted with isatoic anhydride as described in Example 1 to yield 49.4 g. of the anthranilate of D.S. 0.10.

Step 2. Diazotization of cyanoethylstarch anthranilate.—Two and one-half g. of the cyanoethylstarch anthranilate was diazotized as described in Example 1 using one half quantities of reagents to yield the wet diazonium chloride.

Step 3. Coupling to papain.—The wet diazonium chloride was stirred for 30 minutes in a solution of 10 g. of technical grade papain in 150 ml. of water at pH 8:5 and about 20° C. The mixture was stored at 10° C. overnight when the water-insoluble papain was isolated by centrifugation and washing free of excess papain by centrifugation and decantation.

Activity of the product was determined as described in Example 1. A constant level of proteolytic activity equivalent to 45 mg. of soluble papain per gram of dry product was obtained after two successive hydrolyses of casein.

EXAMPLE 4

Preparation of water-insoluble papain

Step 1. Preparation of acetylstarch anthranilate.—Eight and three-tenths g. of acetylated starch of D.S. 1.6 was stirred continuously in 50 ml. of water and 2 g. of sodium carbonate was added followed by 2 g. of isatoic anhydride. The reaction was conducted at about 45° C. for 2 hours. The product was worked up as described in Example 1. The dry product weighed 7.8 g. and assayed to have a D.S. 0.1 of anthranilate.

Step 2. Diazotization of acetylstarch anthranilate.—Two and one-half g. of the acetylstarch anthranilate was diazotized as described in Example 3.

Step 3. Coupling to papain.—The wet diazonium chloride was coupled to papain and the product isolated as described in Example 3.

Activity of the water-insoluble enzyme was determined as described in Example 1. After two consecutive hydrolysis reactions with casein a constant level of enzyme activity equivalent to 72 mg. of soluble papain per gram (dry basis) of product was obtained.

EXAMPLE 5

Preparation of water-insoluble papain

Step 1. Preparation of gelatinized cyanoethylstarch anthranilate.—Two and one-half g. of cyanoethylstarch anthranilate of Example 3 was placed in 75 ml. of water and heated at 95° C. for 10 minutes with continuous stirring. The gelatinized product was cooled to 0°–5° C. for diazotization.

Step 2. Diazotization of gelatinized cyanoethylstarch anthranilate.—The cold gelatinized product from Step 1 was diazotized as described in Example 3 and isolated and washed with water by centrifugation.

Step 3. Coupling to papain.—The diazotized gelatinous product of Step 2 was coupled to papain as described in Example 3 and isolated similarly after adjustment to pH 4 prior to centrifugation.

Activity of the product of Step 3 was determined as described in Example 1. After two consecutive hydrolyses of casein a constant level of enzyme activity equivalent to 451 mg. of soluble papain per gram of product (dry basis) was obtained.

We claim:
1. In a process for preparing active water-insoluble enzyme compositions by chemically binding the enzymes to insoluble polymeric carriers, an improvement which inhibits biological degradation of the carriers which comprises: reacting diazotized acetyl starch anthranilate, having an acetyl degree of substitution (D.S.) of about 1.6 and an anthranilate D.S. of from 0.01 to 0.10, with an excess of enzyme having substituents capable of coupling with diazonium groups.

2. An active water-insoluble enzyme composition comprising the following general formula:

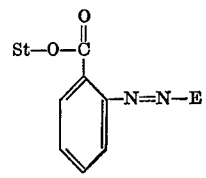

where E=enzyme and St=acetyl starch having an acetyl D.S. of about 1.6.

References Cited

UNITED STATES PATENTS

| | | | |
|---|---|---|---|
| 3,647,630 | 3/1972 | Franks | 195—63 |
| 3,499,886 | 3/1970 | Mehltretter | 260—233.5 |
| 3,511,830 | 5/1970 | Speakman | 260—233.5 |
| 3,388,120 | 6/1968 | Lotzgesell et al. | 260—233.5 |
| 3,557,091 | 1/1971 | Martin et al. | 260—233.5 |
| 3,167,485 | 1/1965 | Katchalski et al. | 195—63 |
| 3,629,123 | 12/1971 | O'Reilly et al. | 195—63 |

FOREIGN PATENTS 214,534  4/1958  Australia.

OTHER REFERENCES

Manecke, G. Reactive Polymers and Their Use for the Preparation of Antibody and Enzyme Resins, Pure and Applied Chemistry, vol. 4, 1962 (pp. 507–520) TP1P8.

Bauman, et al., Preparation of Immobilized Cholinesterase for Use in Aanalytical Chemistry. Analytical Chemistry. Vol. 37, 1965 (pp. 1378–1381), QD71I42.

DAVID M. NAFF, Primary Examiner

U.S. Cl. X.R.

195—68, DIG 11